United States Patent Office 3,357,899
Patented Dec. 12, 1967

3,357,899
METHOD OF RECOVERING FORMIC ACID FROM A WASTE LIQUOR
Max O. Robeson, Corpus Christi, Tex., assignor to Celanese Corporation, a corporation of Delaware
No Drawing. Filed Aug. 30, 1963, Ser. No. 305,835
15 Claims. (Cl. 203—15)

This invention relates broadly to a method of recovering an organic acid from waste liquor and, more particularly, to a new and unobvious method of recovering formic acid from aldol-condensation polyol waste liquors having alkali-metal formate by-product. Specific examples of such waste liquors are those that result from preparing by an aldol condensation reaction such polyols as, for instance, trimethylolethane (TME), trimethylolpropane (TMP), pentaerythritol (PE) and anhydroenneaheptitol (AEH).

The invention will be described with particular reference to the recovery of formic acid from PE waste liquor which, like all others of the above-mentioned class, contains water, an alkali-metal formate, specifically sodium formate, and certain other impurities in varying amounts. Thus, typical analyses of PE waste liquors are as follows:

| Component | Analysis of Pure Grade Waste Liquor, Wt. percent | Analysis of Tech. Grade PE Waste Liquor, Wt. percent |
|---|---|---|
| Sodium formate | 32 | 26.5 |
| Pentaerythritol | 5 | 6.5 |
| Water | 53 | 58.1 |
| By-products* (by difference) | 10 | 8.9 |

*These by-products may include di-PE, poly-PE, linear and cyclic PE formals, and formose sugars (from benzoin condensation of formaldehyde).

There has long been need for an economical method for recovering formic acid (HFo) from the alkali-metal formates that is present in the aforementioned waste liquors, specifically PE waste liquors. Recovery methods that have been proposed and discarded as being impractical or uneconomical include cation-exchange resin treatment, azeotropic distillation, isolation of sodium formate and solvent extraction. For example, with cation-exchange resin treatment, 1 lb. $H_2SO_4$ produces only about 0.3 lb. HFo as dilute HFo unrefined. When azeotropic distillation of the acidified waste liquor is attempted, the water is preferentially removed with the azeotroping agent, e.g., hexane, cyclohexane, or xylene, all three of which form binary azeotropes with HFo. Also, as the concentration of HFo in the residue increases, considerable esterification occurs.

Of the other methods proposed, it may be mentioned that attempts to isolate sodium formate (NaFo) require several processing steps. Furthermore, filtration is difficult unless raw liquor diluent is used. Although the first crop of crystals is found to analyze about 81 wt. percent NaFo, the second crop shows only about 61 wt. percent on analysis. An 80–20 mixture of methyl ethyl ketone and cyclohexane is found to be a good extractant for HFo from an acidified PE waste stream, but the by-products are also extracted; and, after solvent removal by filtration, the resulting HFo distillate is colored and about 30% of the HFo charged to the distillation column has esterified.

The present invention obviates the disadvantages that are inherent in processes such as those briefly described above. It provides HFo in the form of an aqueous distillate containing, by weight, a major proportion (more than 50%), e.g., from about 75% to about 85%, specifically about 80%, of water and a minor proportion (less than 50%), e.g., from about 15% to about 25% of HFo. Or, alternatively and preferably, the HFo is obtained as its maximum boiling azeotrope with water, in which form it contains from about 75% to about 76% by weight of HFo and distills at about 107.5° C. at atmospheric pressure. The thusly isolated HFo is remarkably free from impurities (usually less than 1% by weight of the isolated product) other than water. Furthermore, the present invention provides means for recovering a yield of nearly 70% by weight of HFo from that originally present in the PE waste liquor, in combined form, as NaFo.

In carrying the present invention into effect HFo is recovered from PE waste liquor containing water, NaFo and other impurities by first (Step A) evaporating from the said liquor a substantial part, e.g., at least about 40% and preferably at least about 60% or more by weight, of the water initially present therein. The removal of less than about 40% of the water results in, or tends to result in, inadequate removal of the sodium salt, e.g., $Na_2SO_4$, subsequently. The removal of substantially all or nearly (e.g., 80–90%, by weight) of the water is not precluded but no advantages appear to accrue therefrom. Furthermore, there are disadvantages, for instance, in handling and in subsequent processing steps, e.g., acidification, filtration, etc., due to the high viscosity of the more highly dehydrated liquors. Evaporation can be effected by evaporating the water from the waste liquor at atmospheric pressure in any suitable type of evaporator and at temperatures up to, for example, 115°–130° C. Temperatures beyond about 130° C. may cause serious degradation due to heat-transfer problems through a heavy magma. Evaporation under vacuum or in combination with initial evaporation at atmospheric pressure may sometimes be advantageous.

The residue from Step A is preferably cooled to about 15°–20° C. It is a viscous liquid which usually contains a small amount of PE crystals but ordinarily not a sufficient amount to warrant the expense of their recovery.

Next (Step B), the cooled residue from Step A is acidified by mixing therewith a strong organic or inorganic (mineral) acid, preferably concentrated sulfuric acid, in an amount sufficient to convert at least about 75%, usually not less than about 85% and not more than about 95%, e.g., about 90%, by weight of the NaFo present in the said residue to HFo and the sodium salt of the acid employed. Preferably the residue from Step A is maintained at a temperature of from about 20° C. to about 50° C. while adding the acid to the said residue.

The use of a strong, non-oxidizing acid, e.g., sulfuric acid, in an amount sufficient to convert substantially all (i.e., about 100%) of the NaFo in the residue from Step A to HFo is not precluded. Usually, however, for practical reasons it is desirable to use a little less than the theoretical amount of acid required, e.g., percentage proportions such as have been indicated hereinbefore. Thus, by using less than the stoichiometric amount of acid, specifically $H_2SO_4$ in an amount corresponding to 90% of the theoreical, and adding the $H_2SO_4$ to the residue while the latter is at 20°–50° C., no evolution of CO occurs. This was unobvious and in no way could have been predicted.

One of the main reasons for not adding a stoichiometric amount of a strong acid such as sulfuric acid to the residue from Step A is to avoid the possibility of having present excess $H_2SO_4$, since such excess acid would promote degradation of formic acid in the subsequent flashing step.

The acid employed is preferably one which forms a sodium salt that will precipitate from the acid-treated residue. Concentrated sulfuric acid meets this requirement, is relatively inexpensive and is, therefore, the preferred acid. Illustrative examples of other operative acids are strong, non-oxidizing inorganic or mineral acids such as hydrochloric and phosphoric acids. The use of strong organic acids, e.g., oxalic, p-toluenesulfonic, di- and trichloroacetic acids, etc., is not precluded, but such acids are disadvantageous from a cost standpoint as compared with sulfuric and other commercially available mineral acids. Some of the strong organic acids, however, may be available in a lower-priced, useable salt (e.g., sodium salt) form that would make their use economically feasible.

Next (Step C), the sodium salt of the acid is removed by any suitable means from the residue from Step B, e.g., by filtration, centrifuging, etc. Filtration can be effected using, for instance, a rotary filter or a plate-and-frame filter equipped with a porous screen medium. Hot water backwashing can be employed to remove the sodium salt, e.g., sodium sulfate, from the screen.

The liquor from Step C, that is, the material from which sodium salt of mineral or other acid has been removed, and which is specifically a filtrate when the said sodium salt has been removed by filtration, is next (Step D) distilled under certain particular conditions hereafter more fully described.

P.E. waste liquors contain compounds having reactive hydroxyl groups that undergo esterification with HFo, and particularly under the conditions that normally would be employed in attempting to recover formic acid (generated in situ) from a concentrated PE waste liquor containing said acid. The problem is further complicated by the fact that formic acid is strong enough as an acid so that it is capable of catalyzing its own esterification.

Surprisingly and unobviously it was found that when the liquor, specifically filtrate, from Step C is distilled under heat and reduced pressure while it is in contact with added water then esterification of the HFo component of the said liquor is minimized. The water added to the liquor can be liquid water or it can be in the form of steam, or a combination of liquid water and steam can be used. The amount of added water advantageously is equivalent to at least about 15%, preferably at least about 20%, by weight of the liquor feed to the vacuum distillation unit. Larger amounts of water are not precluded, e.g., amounts equivalent to from about 25% to about 50% weight percent of the formic acid-containing feed to the vacuum-distillation unit, but such larger amounts only add to the operating costs.

The base or pot temperature of the mass being distilled in Step D is usually within the range of from about 50° C. to about 100° C., and the reduced pressure at which the distillation is carried out is generally within the range of from about 50 mm. HgA to about 150 mm. HgA. At pressures substantially below about 50 mm. HgA condensation of the overhead vapors without refrigeration becomes difficult. Above 150 mm. HgA pressure, the esterification of formic acid at accompanying higher base temperatures is encouraged. However, at about 150 mm. HgA pressure the addition of water during formic acid stripping to maintain the base temperature at about 100° C. minimizes this problem.

From the vacuum-distillation unit there is usually obtained an aqueous distillate containing, by weight, a major proportion of water and a minor proportion of HFo, more particularly an aqueous distillate containing from about 15% to about 25% by weight of HFo and the remainder, water.

For practical reasons, it is desirable that the aqueous distillate from Step D be further concentrated. This may be done, if desired, in a separate Step E by subjecting the aqueous distillate from Step D to distillation at atmospheric pressure in a conventional distillation unit thereby to remove water and to obtain HFo as its maximum boiling azeotrope with water. This normal water azeotrope can be concentrated beyond 76% HFo, if desired, by known techniques involving, for example, extraction or azeotropic distillation with an organic solvent.

By the process of this invention there can be obtained, for example, a yield of isolated HFo corresponding to about 67 wt. percent of that liberated upon treatment of a PE waste liquor with a mineral acid, specificaly sulfuric acid. Losses of HFo in the process are due to amounts lost in the filter cake and the residue from the vacuum-distillation unit (about 15% lost in each) and about 3% that is lost in the water distillate.

In order that those skilled in the art may better understand how the present invention can be carried into effect, the following example is given by way of illustration and not by way of limitation. All parts and percentages are by weight unless otherwise stated.

*Example*

The PE waste liquor used in this example was a technical grade that contained the percentages of components given in the second paragraph of this specification.

A. Technical grade of PE waste liquor (2000 g.) or 1600 cc. was evaporated to a base temperature of 120° C. on a hot plate with stirring. This step removed 669 g. or 57% of the water from the initial 1162 g. water in the feedstock.

B. The residue was cooled to 15° C. and 360 g. 95% sulfuric acid was slowly added with cooling applied in order to maintain the concentrated liquor at about 20°–50° C. during the addition of the acid. When part of the acid was added, a heavy slurry formed. This slurry became thin after all the acid had been added. The amount of added acid was equivalent to about 90% of the NaFo found by analysis to be present.

C. After vacuum filtration using a Büchner funnel and a 200-mesh stainless steel screen to remove precipitated $Na_2SO_4$, the filtrate weighed 1153 g. and analyzed 23.9% HFo. The loss of HFo to the sulfate cake was 45 g. or 14%. The wet sulfate cake containing water and PE weighed 538 g. The concentration of HFo in the filtrate was 25%. The foregoing material balance data indicate that $Na_2SO_4 \cdot 10H_2O$ does not exist in HFo.

D. The filtrate of 1153 g. which contained 275 g. HFo was charged to a flask equipped with a short Hempel column section containing one foot of packing (¼″ Berl saddles) to prevent entrainment or splashing. The distillation was conducted at 100 mm. HgA and continued from a base temperature initial of 56° C. to 80° C. There was obtained 600 cc. distillate analyzing 24.3% HFo or 146 g., and which corresponded to about 53% of the HFo in the charge.

The distillation was continued to a base temperature of 100° C. while adding a total of 250 cc. water dropwise to the residue to aid in formic acid stripping and to minimize formic acid esterification with formation of residual by-products. The amount of water added was equivalent to about 25% of the initial feed volume.

Substituting live steam for water in a different run provided no increase in the amount or concentration of HFo in the distillate. In either case the distillate contained from about 16% to about 20% HFo, representing a recovery of about 80% of the amount of HFo in the charge to the distillation unit.

Analysis of the residue showed that about 14% of the HFo in the initial charge was present in the aforesaid residue; and only 6% of the HFo charged was combined through esterification.

E. A portion of the distillate (678 g.) containing 111 g. HFo was distilled at atmospheric pressure using a 30-sieve-tray column. The distillation data are given in the following table.

TABLE.—30-SIEVE TRAY OLDERSHAW COLUMN 2/1 REFLUX RATIO

| Cut No. | B.P., °C. | Cut Wt., g. | Percent HFo in Cut | Wt. HFo, g. |
|---|---|---|---|---|
| 1 | 99.5 | 150 | 0.3 | 0.5 |
| 2 | 99.5 | 102 | 0.2 | 0.2 |
| 3 | 99.7 | 77 | 0.6 | 0.5 |
| 4 | 99.7 | 57 | 0.5 | 0.3 |
| 5 | 99.5 | 50 | 0.5 | 0.2 |
| 6 | 99.5 | 53 | 1.2 | 0.6 |
| 7 | 100 | 28 | 3.2 | 0.9 |
| Total | | | | [1] 3.2 |
| Riser Cut: 8 | 104 | 10 | 21 | 2 |
| Residue Total | | 142 | 74 | 105 |
| Total | | 669 | | [2] 107 |

[1] HFo lost to distillate.
[2] HFo recovered.

The distillation with the column was discontinued when the top temperature reached 104° C. By analysis, the residue contained 74% HFo. This residue was distilled atmospherically almost to dryness using a one-plate distillation assembly. The recovered HFo distilled from 107° C. to 109° C. and was found to contain 74.9% HFo and 24.2% water. The behavior of the entire sieve-tray distillation was similar to that obtained using a known blend of reagent grade HFo and water. This is evidence of the high quality of HFo that can be obtained by the process of the present invention.

The yield of isolated HFo from that liberated initially is about 67%. Percentage losses in individual processing steps have been indicated hereinbefore.

The process can be carried out continuously by using two or more vessels intermittently in the acidification step, and, advantageously, two filter units or their obvious equivalents in filtering or otherwise separating the salt of the mineral acid from the acidified liquor.

In a continuous process the filtrate from the filtration unit is pumped into a vacuum-flashing or distillation unit either together with a stream of added or injected water or as separate streams of filtrate and added water. The added or injected water may be liquid water, or in the form of steam or a combination of both such forms.

Suitable means are provided for heating the vacuum-flashing unit and/or the feed stream being charged thereto. A cooling condenser is also provided for condensing the overhead vapors. The condensate is collected in an accumulator, which is also under vacuum and from which it is led to an atmospheric distillation column, e.g., to a point near the bottom of said column.

In operating the atmospheric distillation column water vapor is continuously removed as an overhead cut and is condensed, while a side cut of formic acid as its aforementioned maximum boiling azeotrope with water is continuously separated. The residue from the bottom of the atmospheric distillation column can be recirculated by any suitable means to the vacuum-flashing unit, e.g., by pumping it to and mixing it with the filtrate from the filtration unit either before or after said filtrate has been admixed with the added water being injected into the vacuum-distillation unit.

The residue from the vacuum-distillation unit can be discharged into the line carrying the feed to said unit. When the build-up or concentration of residue in this vacuum unit becomes excessive, suitable means are provided for a "blow-down," that is, for purging the unit of excessive or too highly concentrated residue. Such purging means also can be provided for the atmospheric distillation column in lieu of or in addition to the purging means forming a part of the vacuum-distillation unit.

It is to be understood that the foregoing detailed description is given merely by way of illustration and that many variations may be made therein without departing from the spirit of the invention.

The embodiments of the invention in which an exclusive property or privilege is claimed are defined as follows:

1. The method of recovering formic acid from pentaerythritol waste liquor containing water, sodium formate and other impurities which comprises:
   (A) evaporating from the said liquor about 40% to 90% by weight of the water initially present therein;
   (B) acidifying the residue from Step A with a strong acid selected from the group consisting of sulfuric acid, hydrochloric acid, phosphoric acid, oxalic acid, p-toluenesulfonic acid and dichloroacetic acid and trichloroacetic acid in an amount sufficient to convert at least about 75% by weight of the sodium formate present in said residue to formic acid and the sodium salt of the said acid;
   (C) filtering sodium salt of the said acid from the residue from Step B; and
   (D) distilling the liquor from Step C under heat and reduced pressure while it is in contact with added water thereby to minimize esterification of the formic acid component of the said liquor and to obtain an aqueous distillate containing, by weight, a major proportion of water and a minor proportion of formic acid.

2. A method as in claim 1 which includes the additional Step E of subjecting the aqueous distillate from Step D to distillation at atmospheric pressure thereby to remove water and to obtain formic acid as its maximum boiling azeotrope with water.

3. A method as in claim 1 wherein the strong acid is a mineral acid.

4. A method as in claim 1 wherein the strong acid is sulfuric acid and the residue from Step A is maintained at from about 20° C. to about 50° C. while adding the said acid thereto.

5. A method as in claim 1 wherein the water added in Step D is at least 15% by weight of said liquid, and is in the form of steam.

6. A method as in claim 1 wherein the water added in Step D is at least 15% by weight of said liquor, and is liquid water.

7. A method as in claim 1 wherein the base temperature of the mass undergoing distillation in Step D is within the range of from about 50° C. to about 100° C.

8. A method as in claim 1 wherein the base temperature of the mass undergoing distillation in Step D is within the range of from about 50° C. to about 100° C. and the reduced pressure is within the range of from about 50 mm. HgA to about 150 mm. HgA.

9. The method of recovering formic acid from pentaerythritol waste liquor containing water, sodium formate and other impurities which comprises:
   (A) evaporating from the said liquor at least about 40% by weight of the water initially present therein;
   (B) acidifying the residue from Step A with sulfuric acid in an amount sufficient to convert not less than about 85% by weight and not more than about 95% by weight of the sodium formate present in said residue to formic acid and sodium sulfate;
   (C) filtering sodium sulfate from the residue from Step B;
   (D) vacuum distilling the filtrate from Step C while said filtrate is in contact with added water to obtain an aqueous distillate containing from about 15% to about 25% by weight of formic acid; and
   (E) subjecting the aqueous distillate from Step D to distillation at atmospheric pressure thereby to remove water and to obtain formic acid as its maximum boiling azeotrope with water.

10. A method as in claim 9 wherein the sulfuric acid is added in an amount sufficient to convert about 90% by weight of the sodium formate present in said residue to formic acid and sodium sulfate, and the residue is maintained at from about 20° C. to about 50° C. while adding the sulfuric acid thereto.

11. A method as in claim 9 wherein the amount of added water is equivalent to at least about 15% by weight of the filtrate undergoing vacuum distillation and the temperature of the base during said vacuum distillation is not higher than about 100° C.

12. The method of claim 9 wherein the base temperature of the mass undergoing distillation in Step D is within the range of from about 50° C. to about 100° C. and the pressure is within the range from about 50 mm. HgA to about 150 mm. HgA.

13. The method of recovering formic acid from aldol-condensation polyol waste liquor containing water and sodium formate which comprises:
    (A) evaporating from the said liquor a substantial part of the water initially present therein;
    (B) acidifying the residue from Step A with a strong acid selected from the group consisting of sulfuric acid, hydrochloric acid, phosphoric acid, oxalic acid, p-toluenesulfonic acid and dichloroacetic acid and trichloroacetic acid in an amount sufficient to convert at least about 75% by weight of the sodium formate present in said residue to formic acid and the sodium salt of the said acid;
    (C) filtering sodium salt of the said acid from the residue from Step B; and
    (D) distilling the liquor from Step C under heat and reduced pressure while it is in contact with added water thereby to minimize esterification of the formic acid component of the said liquor and to obtain an aqueous distillate containing, by weight, a major proportion of water and a minor proportion of formic acid.

14. A method as in claim 13, which includes the additional Step E of subjecting the aqueous distillate from Step D to distillation at atmospheric pressure thereby to remove water and to obtain formic acid as its maximum boiling azeotrope with water.

15. The method of claim 13 wherein the base temperature of the mass undergoing distillation in Step D is within the range of from about 50° C. to about 100° C. and the pressure is within the range of from about 50 mm. HgA to about 150 mm. HgA.

References Cited

UNITED STATES PATENTS

| | | | |
|---|---|---|---|
| 970,145 | 9/1910 | Walker | 260—542 |
| 2,292,926 | 8/1942 | Brubaker et al. | 260—637 |
| 2,407,920 | 9/1946 | Cox | 260—637 X |
| 2,441,602 | 5/1948 | Snow et al. | 260—637 |
| 2,690,993 | 10/1954 | McGrath | 203—95 |

FOREIGN PATENTS 856,322   12/1960   Great Britain.

LORRAINE A. WEINBERGER, *Primary Examiner.*

LEON ZITVER, *Examiner.*

I. R. PELLMAN, S. B. WILLIAMS, *Assistant Examiners.*